(12) United States Patent
Kuhl

(10) Patent No.: US 6,305,184 B1
(45) Date of Patent: Oct. 23, 2001

(54) COOLING TUNNEL FOR EGGS

(76) Inventor: Jeffrey B. Kuhl, 61 Kuhl Rd., Flemington, NJ (US) 08822

( * ) Notice: Subject to any disclaimer, the term of this patent is extended or adjusted under 35 U.S.C. 154(b) by 0 days.

(21) Appl. No.: 09/605,413

(22) Filed: Jun. 28, 2000

(51) Int. Cl.7 ................................................. F25D 25/04
(52) U.S. Cl. ................................................. 62/380; 62/63
(58) Field of Search .............................. 62/378, 380, 63

(56) References Cited

U.S. PATENT DOCUMENTS

| | | |
|---|---|---|
| 1,250,540 | 12/1917 | Young . |
| 1,322,279 | 11/1919 | Allsop et al. . |
| 1,863,484 | 6/1932 | Jones et al. . |
| 1,891,425 | 12/1932 | Kronquest . |
| 1,892,224 | 12/1932 | Sorber . |
| 2,221,343 | 11/1940 | Mulvany . |
| 2,275,588 | 3/1942 | Greene . |
| 3,082,097 | 3/1963 | Haller . |
| 3,166,175 | 1/1965 | Kurtz et al. . |
| 3,273,258 | 9/1966 | Liebert . |
| 3,470,996 | 10/1969 | Lee et al. . |
| 3,623,591 | 11/1971 | Koch et al. . |
| 3,672,530 | 6/1972 | Bridenstine et al. . |
| 3,688,518 | 9/1972 | Goltsos . |
| 3,719,055 | 3/1973 | Shapley et al. . |
| 3,768,553 | 10/1973 | Sollich . |
| 3,831,389 | 8/1974 | Lipona . |
| 3,843,813 | 10/1974 | Driggs . |
| 3,857,980 | 12/1974 | Johnson . |
| 3,882,686 | 5/1975 | Rose . |
| 3,882,769 | 5/1975 | Weber et al. . |
| 4,023,376 * | 5/1977 | Onodera ................................. 62/63 |
| 4,164,129 * | 8/1979 | Stueber ................................. 62/326 |
| 4,201,288 * | 5/1980 | van Capelleveen ................. 198/778 |
| 4,329,850 | 5/1982 | Drummond . |
| 4,830,175 * | 5/1989 | Durst et al. ............................. 198/495 |
| 4,944,162 * | 7/1990 | Lang et al. .............................. 62/380 |
| 5,025,619 | 6/1991 | Cannor . |
| 5,343,714 * | 9/1994 | Kiczek et al. ........................... 62/381 |
| 5,377,492 | 1/1995 | Robertson et al. . |
| 5,460,015 | 10/1995 | Venetucci . |
| 5,474,794 | 12/1995 | Anderson et al. . |
| 5,520,006 * | 5/1996 | Middleton ............................... 62/80 |
| 5,568,734 | 10/1996 | Niemerg et al. . |
| 5,694,836 | 12/1997 | Blevins . |
| 5,868,000 | 2/1999 | Morris, Jr. et al. . |

* cited by examiner

*Primary Examiner*—William Doerrler
(74) *Attorney, Agent, or Firm*—Sperry, Zoda & Kane

(57) ABSTRACT

A cooling tunnel defining a housing with a cooling chamber therein with an entrance opening to allow eggs traveling upon a conveyor to enter the cooling chamber and an exit opening to allow the eggs to exit therefrom. A conveyor extends throughout the cooling chamber continuously from the entrance opening to the exit opening to convey eggs therethrough. A cooling device is defined within the housing for supplying air through a cooling air inlet conduit to the cooling chamber and a cooling air outlet conduit is provided for receiving air from the cooling chamber and providing this air to the cooling device to facilitate further cooling thereof. The cooling chamber may include cooler air in the lower regions thereof to facilitate cooling of the eggs as desired and the conveyor may be angled such as to incline downwardly or upwardly within the cooling chamber such that it can coil around upon itself to keep the eggs within the cooling chamber for a longer period of time while traveling through the egg processing system to facilitate cooling thereof.

16 Claims, 2 Drawing Sheets

COOLING TUNNEL FOR EGGS

BACKGROUND OF THE INVENTION

1. Field of the Invention

The present invention deals with the field of devices used for cooling eggs traveling through the egg processing stations of an egg processing plant. Initially eggs are washed and, as such, the temperature thereof is raised during this washing process. Also the eggs are warm having been only recently laid. As a result eggs will exit the washer at an elevated temperature.

It is important that this temperature be lowered in order to prevent the possibility of bacterial growth which could result in salmonella or other undesirable bacterial growths.

When the eggs exit the washer they are often of a temperature as high as 80 or 90 degrees due to the fact that the eggs have been only recently laid as well as washed.

It does take a significant amount of time for eggs to move from 80 or 90 degrees to the desired temperature of approximately 45 degrees. Therefore the eggs must be maintained in the cooling chamber for an extended period of time. If the eggs were allowed to travel upon a linear conveyor the length of such a cooling chamber would be excessive and expensive. That is, the cooling chamber would be very long due to the fact that reducing the temperature of the interior of recently laid and washed eggs by 45 degrees Fahrenheit takes a significant amount of time even within a cooled chamber. Also line length is a problem in such a processing plant because of the limitation in the size of the processing plant itself. For this reason the present invention provides a means for allowing the conveyor to loop upon itself and gradually decrease the temperature of eggs within a confined section of the processing line while at the same time allowing the eggs to be reduced to the desired temperature of approximately 45 degrees Fahrenheit.

Preferably such a cooling tunnel would supply the eggs directly to a grader which would then separate the eggs by size for packing thereof.

2. Description of the Prior Art

There are numerous devices which have been utilized for the purpose of cooling items such as eggs and these are shown in U.S. Pat. No. 1,250,540 patented Dec. 18, 1917 to W. Young and assigned to Soap Works Equipment Company on a "Method Of Rapidly Aging Solidified Plastic Articles"; and U.S. Pat. No. 1,322,279 patented Nov. 18, 1919 to T. Allsop et al and assigned to The Philadelphia Drying Machinery Company on a "Drying-Machine"; and U.S. Pat. No. 1,863,484 patented Jun. 14, 1932 to C. L. Jones et al and assigned to Dryice Corporation of America on a "Storage House"; and U.S. Pat. No. 1,891,425 patented Dec. 20, 1932 to A. Kronquest and assigned to Continental Can Company, Inc. on a "Freezing Apparatus"; and U.S. Pat. No. 1,892,224 patented Dec. 27, 1932 to D. Sorber on an "Apparatus For Freezing Canned Goods"; and U.S. Pat. No. 1,923,721 patented Aug. 22, 1933 to G. Glenn on a "Hinge"; and U.S. Pat. No. 2,221,343 patented Nov. 12, 1940 to H. Mulvany on a "Method For Processing And Precooling Eggs"; and U.S. Pat. No. 2,275,588 patented Mar. 10, 1942 to E. Greene on a "Fruit Cooling Apparatus"; and U.S. Pat. No. 3,082,097 patented Mar. 19, 1963 to A. Haller and assigned to Allen C. Blakely and Phyllis T. Blakely on a "Process For Preserving Perishable Products By Refrigeration"; and U.S. Pat. No. 3,166,175 patented Jan. 19, 1965 to J. Kurtz et al and assigned to Automatic Poultry Feeder Company on an "Egg Collection And Transveyor System"; and U.S. Pat. No. 3,273,258 patented Sep. 20, 1966 to R. Liebert on an "Egg Dryer"; and U.S. Pat. No. 3,470,996 patented Oct. 7, 1969 to E. Lee et al and assigned to General Foods Corporation on a "Surge Unit"; and U.S. Pat. No. 3,623,591 patented Nov. 30, 1971 to H. Koch et al and assigned to Henry Y. Kuhl and Paul R. Kuhl on a "Device For Ordering Rollable Articles, Delivered In a Disordered Delivery Flow"; and U.S. Pat. No. 3,672,530 patented Jun. 27, 1972 to O. Bridenstine et al and assigned to Phillips Petroleum Company on a "Tray Collar And Tray-Collar Combinations"; and U.S. Pat. No. 3,688,518 patented Sep. 5, 1972 to C. Goltsos and assigned to Teckton, Inc. on a "Refrigerated Conveyor System"; and U.S. Pat. No. 3,719,055 patented Mar. 6, 1973 to G. Shapley et al and assigned to Frick Company on a "Continuous Belt Freezer Having Removable Compartments"; and U.S. Pat. No. 3,768,553 patented Oct. 30, 1973 to H. Sollich and assigned to Sollich OHG on a "Cooling Tunnel"; and U.S. Pat. No. 3,831,389 patented Aug. 27, 1974 to S. Lipona on "Cooling Food Products"; and U.S. Pat. No. 3,843,813 patented Oct. 22, 1974 to L. Driggs and assigned to Nutrionics Machine Corporation on a "Method And Apparatus For Treating Eggs"; and U.S. Pat. No. 3,857,980 patented Dec. 31, 1974 to C. Johnson on a "Process For Preparation And Preservation Of Eggs"; and U.S. Pat. No. 3,882,686 patented May 13, 1975 to B. Rose on a "Method And Apparatus For Cooling Eggs"; and U.S. Pat. No. 3,882,769 patented May 13, 1975 to J. Weber et al on an "Egg Handling System"; and U.S. Pat. No. 4,329,850 patented May 18, 1982 to R. Drummond on a "Food Product Chiller"; and U.S. Pat. No. 5,025,619 patented Jun. 25, 1991 to R. Cannon and assigned to Robert W. Cannon on a "Method And Apparatus For Incubating And Hatching Eggs"; and U.S. Pat. No. 5,377,492 patented Jan. 3, 1995 to T. Robertson et al and assigned to The Laitram Corporation on a "Conveyor System For Chilling Food Products"; and U.S. Pat. No. 5,460,015 patented Oct. 24, 1995 to J. Venetucci and assigned to Liquid Carbonic Corporation on a "Freezer With Imperforate Conveyor Belt"; and U.S. Pat. No. 5,474,794 patented Dec. 12, 1995 to K. Anderson et al and assigned to North Carolina State University on a "Rapid Chilling Of Shell Eggs Using Cryogenic Gases"; and U.S. Pat. No. 5,568,734 patented Oct. 29, 1996 to H. Niemerg et al and assigned to Krupp Polysius AG on a "Double Layer Cooler"; and U.S. Pat. No. 5,694,836 patented Dec. 9, 1997 to E. Blevins and assigned to Cool Eggspress on a "Modular Loose Egg Cooling, Storage And Transport System And Method"; and U.S. Pat. No. 868,000 patented Feb. 9, 1999 to W. Morris, Jr. et al and assigned to Morris & Associates on an "Auger Type Poultry Chiller With Clumping Prevention".

SUMMARY OF THE INVENTION

The present invention provides a cooling tunnel for the cooling of eggs moving through the egg processing machinery normally located near an egg farm. The cooling tunnel preferably includes a housing which defines a cooling chamber therein for cooling of eggs passing therethrough normally located immediately after the egg washer and prior to the egg grader. The housing preferably defines an entrance opening and an exit opening in fluid flow communication with respect to the cooling chamber to facilitate the movement of eggs into the cooling chamber through the entrance opening and outwardly therefrom through the exit opening.

A conveyor preferably extends from the entrance opening throughout the cooling chamber such that it extends to the exit opening in order to facilitate movement of eggs through the cooling chamber to facilitate cooling thereof. The conveyor preferably is oriented angularly inclined along the longitudinal direction thereof within the cooling chamber in order to provide a number of different paths preferably being somewhat circuitous within the cooling chamber to allow the eggs traveling upon the conveyor to remain for a longer period of time within the cooling chamber to thereby increase the period of time for cooling thereof and allow the extensive cooling that is normally required to reduce and 80 or 90 degree Fahrenheit egg to 45 degrees Fahrenheit. The conveyor means preferably will travel in one of a number of different paths wherein it changes elevation within the cooling chamber such as a spiral, oblong spiral or other such single continuous path from the entrance to the exit which allows the eggs to remain in the cooling chamber for an extended period of time.

A cooling device is also included within the housing for cooling of the air therewithin. A cooling air inlet conduit is positioned within the housing adjacent to the cooling device to provide a flow path for cooled air to pass from the cooling means to the cooling chamber. A cooling air outlet conduit is also positioned within the housing adjacent to the cooling device to provide a flow path for air to return from the cooling chamber to the cooling device to facilitate further cooling thereof such that it can pass through the cooling air inlet conduit and return to the cooling chamber.

The particular configuration for the conveyor within the housing can be one of many different possible conceivable configurations. It is only necessary that the path of the movement of eggs or the path of the conveyor within the housing be somewhat circuitous and be continuous and start from the entrance and end at the exit. In this manner the length of the cooling station can be minimized while the time that the eggs spend within the cooling chamber of the housing can be maximized. The orientation of the entrance and the opening can be at various heights. In the preferred configuration the entrance opening will be above the position of the exit opening. However, the exit opening could be positioned above the entrance opening under certain operating conditions.

In any case the conveyor generally will change elevation as it travels through the cooling chamber and will coil below itself and/or above itself such that it is positioned at more than one vertical elevation within the cooling chamber to allow lengthening of the circuitous flow path for eggs traveling on the conveyor within the cooling chamber.

One of the preferred configurations for the conveyor within the cooling chamber is the general shape of a spiral. This spiral can be an ascending spiral in the case where the exit is at a higher elevation than the entrance usually or can be a descending spiral which is the more common case where the entrance opening is preferably above the exit opening. The conveyor when configured as a descending spiral will pick up eggs at the entrance opening and carry the eggs through the gradually downwardly inclined angularly oriented spiral until it reaches the level of the exit opening at which point the eggs will be delivered by the conveyor to the exit opening to be picked up by the conveyor or other device designed to transport these cooled eggs for grading and/or packing.

In a preferred configuration the housing will be generally square or rectangular and the path of the conveyor within the cooling chamber will be that of an oblong spiral. This oblong spiral path is shown schematically in FIG. 2 wherein a plurality of generally linear longitudinal conveyor section extending along the walls of the housing are connected by 90 degree bend conveyor sections positioned at each corner where the perpendicularly oriented walls of the housing intersect to form such corner. This spiral path is shown in the schematic overhead view of FIG. 2.

With the use of the preferred configuration shown in either FIGS. 1 or 2 the eggs as initially introduced into the cooling chamber will be at the higher elevation of the entrance opening. As the eggs are cooled they will travel downwardly along the spiral or oblong spiral path of the conveyor into the cooler lower sections of the cooling chamber itself. These lower sections are cooler preferably due to the introduction of a temperature gradient wherein the coldest air is located in the lowermost portion of the cooling chamber and the warmer of the cooled air is located in the upper portions thereof. As such, by exposing the eggs to the coldest region of the cooling chamber immediately prior to movement thereof to the exit opening the cooling of the eggs is maximized. This is achieved by the temperature stratification within the cooling chamber which allows the cooler air to remain in the lower portions and the warmer air to remain in the upper portions.

In the preferred configuration of the housing it is of a generally rectangular or square configuration including a first wall with a second wall spatially disposed therefrom and extending generally parallel thereto. A third wall extends between the first wall and the second wall and extends generally perpendicular with respect to both. A fourth wall extends between the first and second walls and is spatially disposed from and generally parallel with respect to the third wall to define the housing means into a generally rectangular configuration. With this housing configuration the cooling air inlet conduit preferably includes a first cooling inlet conduit extending along the first wall of the housing between the cooling chamber and the first wall means to facilitate thermal isolating of the cooling chamber from the external ambient environment. Similarly a second cooling inlet conduit will extend along the second wall of the housing between the cooling chamber and the second wall to further facilitate thermal isolation of the cooling chamber means from the external ambient environment.

Also with this rectangular configuration of the housing the cooling air outlet conduit will preferably extend along the third wall between the cooling chamber and the third wall to facilitate thermal isolation of the cooling chamber from the external ambient environment.

To further minimize the movement of heat into the cooling chamber from the external ambient environment an insulation means can be included along the housing to minimize the flow of heat therethrough toward the cooling chamber defined therewithin.

The conveyor of the present invention preferably comprises a wire belt conveyor which allows the configuration of the conveyor to be made into a spiral or oblong spiral configuration more conveniently. Furthermore the conveyor preferably includes a conveyor cleaning station or apparatus positioned within the housing adjacent the conveyor. This conveyor cleaning apparatus is designed to clean the conveyor surface itself preferably after the eggs have exited therefrom and prior to the introduction of new eggs thereon such that the conveyor itself is maintained in a sanitary and workable condition. Preferably this conveyor cleaning apparatus will be an automated system which will automatically clean the wire belt or mesh conveyor as it travels through the conveyor cleaning station.

It is an object of the present invention to provide a cooling tunnel for significantly reducing the temperature eggs during passage therethrough wherein maintenance requirements are minimized.

It is an object of the present invention to provide a cooling tunnel for significantly reducing the temperature eggs during passage therethrough wherein the amount of space taken up along the egg machinery processing line is minimized.

It is an object of the present invention to provide a cooling tunnel for significantly reducing the temperature eggs during passage therethrough wherein down time is minimized.

It is an object of the present invention to provide a cooling tunnel for significantly reducing the temperature eggs during passage therethrough wherein the temperature of the egg can be reduced substantially by allowing the egg to pass through the cooling chamber a multiple number of times due to the egg conveyor being angularly inclined as it loops or coils through the cooling tunnel.

It is an object of the present invention to provide a cooling tunnel for significantly reducing the temperature eggs during passage therethrough wherein the temperature of eggs can be greatly decreased since the eggs will travel upon a gradually ascending or descending spiral path as the conveyor travels therethrough.

It is an object of the present invention to provide a cooling tunnel for significantly reducing the temperature eggs during passage therethrough wherein the temperature of eggs can be greatly decreased since the eggs will travel upon a gradually ascending or descending oblong spiral path as the conveyor travels therethrough.

It is an object of the present invention to provide a cooling tunnel for significantly reducing the temperature eggs during passage therethrough wherein eggs can be initially exposed to cool air and subsequently exposed to the coldest air immediately prior to exiting of the conveyor to enhance cooling thereof.

It is an object of the present invention to provide a cooling tunnel for significantly reducing the temperature eggs during passage therethrough wherein a cooling air inlet conduit extends from the cooling chamber to the cooling means between the cooling chamber and the external ambient environment to maintain the cooling chamber in a colder condition.

It is an object of the present invention to provide a cooling tunnel for significantly reducing the temperature eggs during passage therethrough wherein the cooling air outlet conduit extends between the cooling means and the cooling chamber to maintain thermal isolation of the cooling chamber from the external ambient environment.

It is an object of the present invention to provide a cooling tunnel for significantly reducing the temperature eggs during passage therethrough wherein insulation is provided along the outer walls of the housing to minimize travel of heat therethrough.

It is an object of the present invention to provide a cooling tunnel for significantly reducing the temperature eggs during passage therethrough wherein a conveyor cleaning apparatus is defined within the housing chamber for cleaning of the egg conveyor automatically during each movement cycle thereof.

It is an object of the present invention to provide a cooling tunnel for significantly reducing the temperature eggs during passage therethrough wherein the entrance opening allows eggs to enter the upper portion of the cooling chamber and the exit opening allows eggs to exit from the lower portion of the cooling chamber to maximize cooling thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
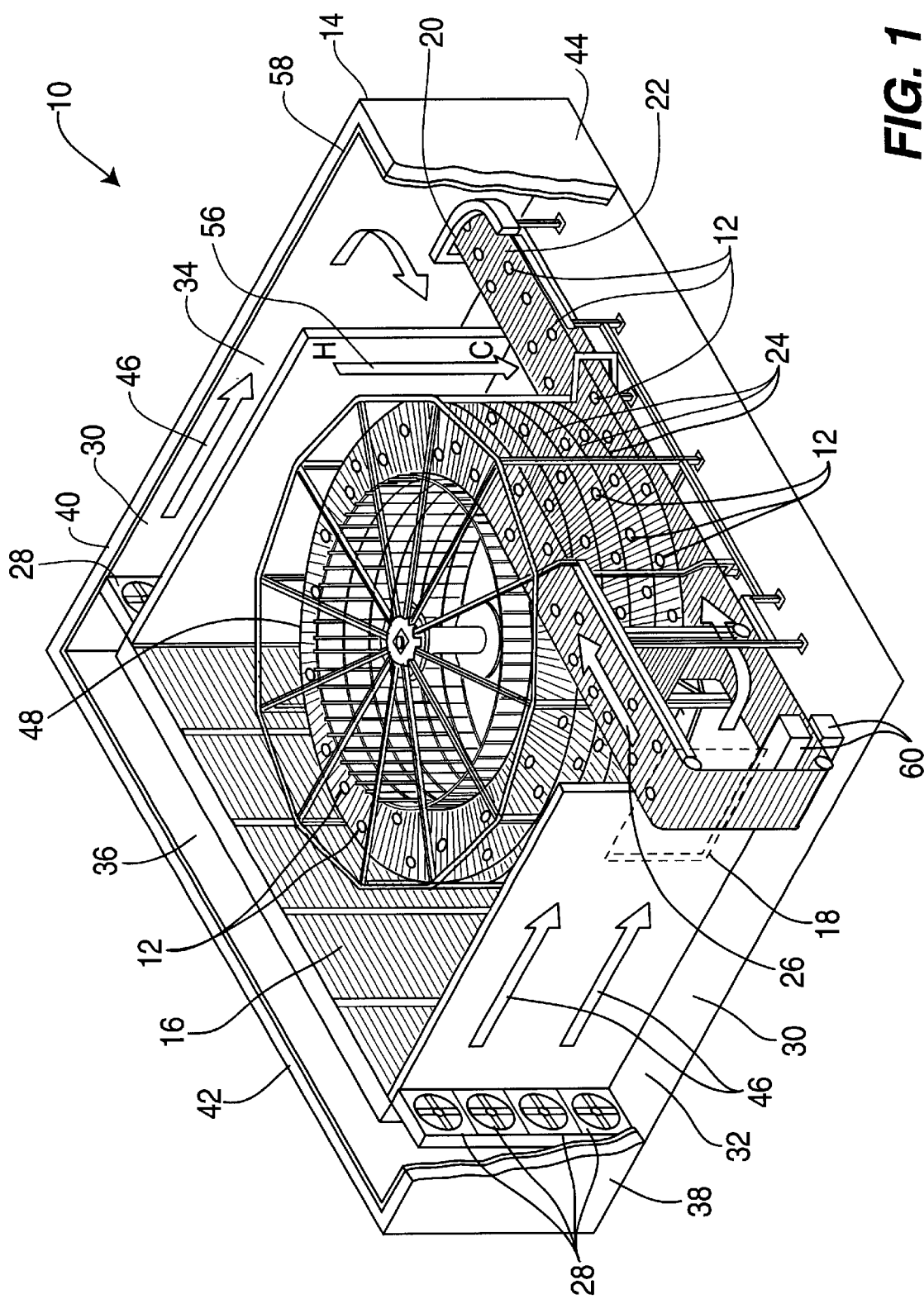
FIG. 1 is a perspective illustration of an embodiment of the cooling tunnel of the present invention.

The present invention provides a cooling tunnel 10 used for the purpose of cooling eggs 12 traveling upon a conveyor 22 preferably a wire belt or wire mesh conveyor therethrough. The cooling tunnel 10 is positioned within a housing 14. Housing 14 defines an entrance opening means 18 for allowing eggs 12 to enter therethrough to be placed upon the conveying means 22 thereadjacent. The eggs are then conveyed throughout the cooling chamber 16 at various elevations in order to achieve rapid cooling thereof. Once cooled the eggs are conveyed to an exit opening 20 defined in the housing 14 to allow the eggs to exit. Normally the eggs will exit to a grader which separates the eggs according to size and/or weight.

Eggs are provided to the entrance opening 18 normally from an egg washer and immediately after the eggs are laid. Such eggs are normally 80 to 90 degrees Fahrenheit in temperature and need to be cooled in order to prevent the growth of salmonella and other bacterial contaminants normally associated with eggs. The cooling tunnel 10 of the present invention by passing the eggs in a circuitous path through the cooling chamber 16 of the housing 14 provide a means for cooling the eggs from the elevated temperature of 80 to 90 degrees Fahrenheit to a temperature of approximately 45 degrees Fahrenheit at which temperature salmonella or other bacterial contaminants will not grow.

To achieve the movement of the eggs in a circuitous path through the cooling chamber 16 a plurality of angularly inclined sections 24 are included in the path 26 of the conveyor movement. The conveyor 22 preferably moves upwardly and downwardly in an angularly inclined and declined manner in order to ascend and descend to various locations within the cooling tunnel 10 and in this manner defines a circuitous path allowing the eggs to be exposed to the cool environment of the cooling chamber 16 for an extended period of time which is necessary in order to reduce the temperature of the eggs by as much as 40 to 50 degrees Fahrenheit.

The cooling within the cooling chamber 16 is achieved by the operation of a cooling device 28 which is adapted to cool air supplied to it through a cooling air outlet conduit 36. Cooling air outlet conduit 36 is adapted to receive air from the cooling chamber for movement thereof to the cooling means 28 to facilitate further cooling thereof. A cooling air inlet conduit 30 is adapted to receive air from the cooling means 28 and allow the air to move therefrom into the cooling chamber 16.

In a preferred configuration of the present invention the housing 14 will define a first wall means 38 and second wall means 40 spatially disposed therefrom and parallel to the first wall. The third wall 42 will extend between the first and second wall and be approximately perpendicular thereto. Fourth wall 44 will extend between the first and second wall and be perpendicular with respect thereto at a position spatially disposed from the third wall 42 and in this manner define a generally rectangular housing.

The cooling air inlet conduit 30 preferably defines a first cooling inlet conduit 32 which extends along the first wall means 38 between the cooling chamber 16 and the first wall 38. In this manner the first cooling inlet conduit 32 will aid in thermally isolating the cooling chamber 16 from the external ambient environment along the first wall 38 of housing 14.

In a similar manner a second cooling inlet conduit 34 which supplies cooled air from the cooling means 28 to the cooling chamber 16 will extend along the second wall means 40 to thereby aid in thermally insulating the cooling chamber 16 from the external ambient environment along the second wall 40 of the housing 14.

The air flow path as defined by the arrows 46 will allow air to be cooled within the cooling means 28 which will thereafter pass through the cooling air inlet conduit 30, that is, through the first and second cooling inlets 32 and 34 to allow this cooled air to move into the cooling chamber 16. Air will then exit from the cooling chamber 16 into the cooling air outlet conduit 36 where it will be re-supplied to the cooling means 28 for further cooling thereof.

In a preferred configuration of the present invention the configuration of the conveyor 22 will be that of a descending spiral 48 as shown in FIG. 1. With this configuration the entrance opening 18 will be defined in the housing 14 at a position vertically significantly above the position of the exit opening 20.

Thus eggs will be supplied to the conveyor 22 through the entrance opening 18 at an elevated position and will travel along the descending spiral 48 of the conveyor 22 in such a manner as to gradually reach the lower position of the exit opening 20. The conveyor 22 will then carry the eggs through this downward spiral and once it reaches the lower level of the exit opening 20 the eggs will be conveyed thereto for exiting.

Figure 2:
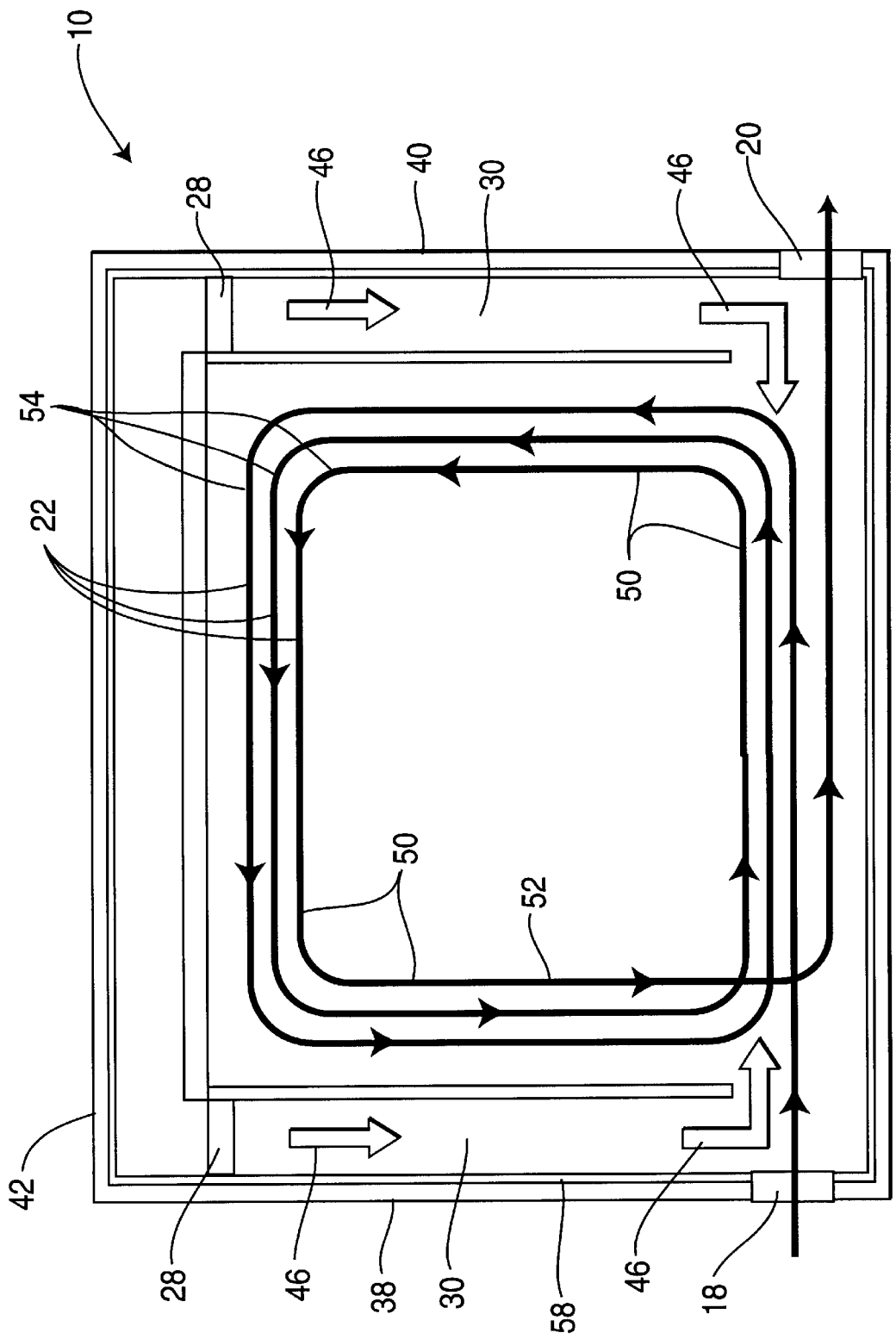
FIG. 2 is a top plan schematic view of an alternative embodiment of the present invention showing the conveyor moving through an oblong spiral path.

This same gradual downward spiral is achieved by the configuration shown in FIG. 2 which shows an oblong spiral path. This oblong spiral path works similarly to the configuration shown in FIG. 1. However, it includes a plurality of linear longitudinal conveyor sections 52 extending along the walls of the rectangular or square housing. It also includes a plurality of 90 degree bend conveyor sections 54. One such 90 degree bend conveyor section 54 is positioned between each pair of linear longitudinal conveyor sections 52 to allow them to move from one perpendicular wall of the housing 14 to an adjacent perpendicular wall.

One specific advantage of the gradual descending spiral 48 or gradually descending oblong spiral path 50 is the inclusion of a temperature stratification gradient shown by arrow 56. This gradient is achieved by cooperation between the cooling means 28 and the cooling chamber 16. The air within the cooling chamber 16 will generally be warmer in the upper areas and will be generally colder in the lower levels. This is true due to the normal tendency of cold air to settle and warm air to rise. As such, by the cooling of air by the cooling means 28 and supplying thereof to the cooling chamber 16 a stratification of the temperature of the cooling air within the cooling chamber 16 is achieved. Thus the eggs as they enter through the entrance opening 18 will be subjected to the warmer of the cooled air initially. As the eggs cool they will travel downwardly through the descending spiral 48 or the oblong descending spiral path 50 and they will become exposed to the colder air after they have been already somewhat chilled. This will greatly increase the efficiency in cooling of the eggs as they travel downwardly and are positioned adjacent to the exit opening 20 to facilitate exiting thereof.

To further minimize the flow of heat inwardly through the external walls of the housing 14 an insulation means 58 may extend across the inner or outer portion of the housing walls in such a manner as to aid in thermally isolating the cooling chamber 16 from the external ambient environment.

In another preferred configuration as shown in FIG. 1 the cooling tunnel 10 of the present invention will include an automated conveyor cleaning apparatus 60 which is designed to clean the conveyor 22 as it travels through its cycle. In the preferred configuration as shown in FIG. 1 the conveyor will be cleaned by the conveyor cleaning apparatus 60 after the eggs 12 have exited therefrom at the exit opening 20 and prior to the placement of eggs thereon again at entrance opening 18. In this manner the conveyor means 22 will be cleaned once during each cycle thereby maintaining sanitary and workable operating conditions for the conveyor throughout its circuitous path of movement within the cooling tunnel 10.

In the preferred configuration the cooling means 28 will comprise large cooling units with a capacity as large as twenty tons for achieving full cooling of the air within the cooling chamber means 16. The conveyor itself is preferably a wire belt or wire mesh conveyor which facilitates the movement of the conveyor through the circuitous path within the cooling chamber 16 and certainly facilitates movement of the conveyor through a spiral or oblong spiral path 48 or 50 as shown in FIGS. 1 and 2.

In accordance with the prior art eggs are often placed in an insulated carton after washing or after laying at a temperature of approximately 90 degrees Fahrenheit. They are positioned as such in a refrigerated holding room and contain many hours for the eggs to cool properly thereby enhancing the chance of the growth of salmonella within the eggs during that time. The present invention provides a much more rapid cool down time due to the movement of eggs continuously about a circuitous path through the entire internal defined volume of the cooling chamber. This achieves cooling without requiring the eggs to be removed from the conveyors themselves or from the automated processing of the eggs and also allows a limited amount of line space to be utilized for the cooling operation. Normally eggs are either removed from the processing station to sit in a refrigerated area for cooling for an extended period of time or are cooled along an extremely long cooling section defined linearly within the egg processing line. Neither of these processing designs have been found to be usable since space along the line is paramount and the time to reduce the temperature from 90 degrees to 45 degrees Fahrenheit for stationery eggs within a refrigerated environment is rather lengthy and requires the eggs to be removed and then replaced on a conveyor thereafter.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A cooling tunnel means particularly usable for eggs comprising:

A. a housing means defining a cooling chamber means therewithin for cooling of eggs passing therethrough, said housing means further defining an entrance opening means and an exit opening means in fluid flow communication with respect to said cooling chamber means to facilitate the movement of eggs into said cooling chamber through said entrance opening and outwardly therefrom through said exit opening means to facilitate cooling thereof, said entrance opening means being positioned vertically higher than said exit opening mean, said cooling chamber means being operable to create a temperature stratification gradient therewithin wherein the cooler portion of the cooled air is located in the lower levels of said cooling chamber means and the warmer portion of the cooled air is located in the higher levels of said cooling chamber means;

B. a conveyor means extending downwardly from said entrance opening throughout said cooling chamber means and extending to said exit opening means therebelow to facilitate the movement of eggs gradually downwardly throughout said cooling chamber means to facilitate slowly cooling thereof, said conveyor means being longitudinally angularly inclined downwardly within said cooling chamber means in order to lengthen the path of movement of said conveyor means therewithin to allow the eggs traveling thereupon to be located within said cooling chamber for an increased period of time to further facilitate slowly reducing of the temperature of the eggs as conveyed downwardly;

C. a cooling means positioned within said housing means for cooling of air therewithin;

D. a cooling air inlet conduit means positioned within said housing means adjacent said cooling means to provide a flowpath for cooled air to pass from said cooling means to said cooling chamber means for cooling thereof;

E. a cooling air outlet conduit means positioned within said housing means adjacent said cooling means to provide a flowpath for air to return from said cooling chamber means to said cooling means for further cooling thereof;

F. a conveyor cleaning apparatus positioned within said housing means adjacent said conveyor means and adapted to clean said conveyor means during each cycle of movement thereof within said housing means.

2. A cooling tunnel means particularly usable for eggs as defined in claim 1 wherein said conveyor means is coiled below itself in order to be at more than one vertical elevation within said cooling chamber means to lengthen the path of travel thereof within said cooling chamber to facilitate further cooling of eggs traveling thereupon.

3. A cooling tunnel means particularly usable for eggs as defined in claim 1 wherein said conveyor means is configured in the general shape of a descending spiral extending between said exit opening and said entrance opening to lengthen the path of movement of eggs being carried thereupon for cooling.

4. A cooling tunnel means particularly usable for eggs as defined in claim 1 wherein said conveyor means descends in a spiral path extending from said entrance opening toward said exit opening to lengthen the path of movement of eggs being carried thereupon for cooling.

5. A cooling tunnel means particularly usable for eggs as defined in claim 3 wherein said conveyor means descends in an oblong spiral path extending from said entrance opening toward said exit opening to lengthen the path of movement of eggs being carried thereupon for cooling.

6. A cooling tunnel means particularly usable for eggs as defined in claim 1 wherein said conveyor configured in an oblong spiral path includes a plurality of generally linear longitudinal conveyor sections with each pair of adjacent linear longitudinal sections being interconnected to one another by a ninety degree bend conveyor section to form an oblong spiral path therewith.

7. A cooling tunnel means particularly usable for eggs as defined in claim 1 wherein said cooling air inlet conduit means extends adjacent said entrance opening means and said exit opening means to minimize loss of cooled air therethrough and to enhance cooling characteristics within said cooling chamber means.

8. A cooling tunnel means particularly usable for eggs as defined in claim 1 wherein said cooling air outlet conduit means extends through said housing means at a position spatially disposed from said entrance opening means and exit opening means to facilitate cooling of air from said cooling chamber means.

9. A cooling tunnel means particularly usable for eggs as defined in claim 1 wherein said entrance opening means is positioned higher than said exit opening means and wherein said conveyor means in inclined downwardly longitudinally from said entrance opening means to said exit opening means to initially expose the eggs traveling upon said conveyor means within said cooling chamber means to the warmer portion of the cooled air and to thereafter expose the eggs traveling upon said conveyor means within said cooling chamber means to the cooler portion of the cooled air located at the lower levels within said cooling chamber means adjacent said exit opening means to facilitate cooling of eggs traveling upon said conveyor means within said cooling chamber means immediately prior to exiting therefrom.

10. A cooling tunnel means particularly usable for eggs as defined in claim 1 wherein said housing means is of a generally rectangular configuration and includes:

A. a first wall means;

B. a second wall means spatially disposed from said first wall means and extending generally parallel thereto;

C. a third wall means extending between said first wall means and said second wall means and extending generally perpendicularly with respect thereto; and D. a fourth wall means extending between said first wall means and said second wall means spatially disposed from and generally parallel with respect to said third wall means to form said housing means into a generally rectangular configuration.

11. A cooling tunnel means particularly usable for eggs as defined in claim 10 wherein said cooling air inlet conduit means comprises:

A. a first cooling inlet conduit extending along said first wall means of said housing means between said cooling chamber means and said first wall means to facilitate thermal isolating of said cooling chamber means from the external ambient environment; and B. a second cooling inlet conduit extending along said second wall means of said housing means between said cooling chamber means and said second wall means to facilitate thermal isolation of said cooling chamber means from the external ambient environment.

12. A cooling tunnel means particularly usable for eggs as defined in claim 11 wherein said cooling air outlet conduit means extends along said third wall means between said cooling chamber means and said third wall means to facilitate thermal isolation of said cooling chamber means from the external ambient environment.

13. A cooling tunnel means particularly usable for eggs as defined in claim 1 wherein said housing means includes an insulation means therealong to facilitate thermal isolation of said cooling chamber means from the external ambient environment.

14. A cooling tunnel means particularly usable for eggs as defined in claim 1 wherein said conveyor means comprises a wire belt conveyor apparatus.

15. A cooling tunnel means particularly usable for eggs comprising:
   A. a housing means defining a cooling chamber means therewithin for cooling of eggs passing therethrough, said housing means further defining an entrance opening means and an exit opening means in fluid flow communication with respect to said cooling chamber means to facilitate the movement of eggs into said cooling chamber through said entrance opening and outwardly therefrom through said exit opening means to facilitate cooling thereof, said entrance opening means being positioned vertically higher than said exit opening means, said housing means including an insulation means therealong to facilitate thermal isolation of said cooling chamber means from the external ambient environment, said cooling chamber means being operable to create a temperature stratification gradient therewithin wherein the cooler portion of the cooled air is located in the lower levels of said cooling chamber means and the warmer portion of the cooled air is located in the higher levels of said cooling chamber means;
   B. a conveyor means extending downwardly from said entrance opening throughout said cooling chamber means and extending to said exit opening means therebelow to facilitate the movement of eggs gradually downwardly throughout said cooling chamber means to facilitate cooling thereof, said conveyor means being longitudinally angularly downwardly inclined within said cooling chamber means in order to lengthen the path of movement of said conveyor means therewithin to allow the eggs traveling thereupon to be located within said cooling chamber for an increased period of time to further facilitate slowly reducing of the temperature of the eggs as conveyed downwardly, said conveyor means being inclined downwardly longitudinally from said entrance opening means to said exit opening means, said conveyor means descending in a spiral path extending from said entrance opening toward said exit opening to lengthen the path of movement of eggs being carried thereupon for cooling;
   C. a cooling means positioned within said housing means for cooling of air therewithin, said cooling means being operable to create a temperature stratification gradient within said cooling chamber means wherein the cooler portion of the cooled air is located in the lower levels of said cooling chamber means and the warmer portion of the cooled air is located in the higher levels of said cooling chamber means, said conveyor means being inclined downwardly longitudinally from said entrance opening means to said exit opening means to initially expose the eggs traveling upon said conveyor means within said cooling chamber means to the warmer portion of the cooled air and to thereafter expose the eggs traveling upon said conveyor means within said cooling chamber means to the cooler portion of the cooled air located at the lower levels within said cooling chamber means adjacent said exit opening means to facilitate further cooling of eggs traveling upon said conveyor means within said cooling chamber means immediately prior to exiting therefrom;
   D. a cooling air inlet conduit means positioned within said housing means adjacent said cooling means to provide a flowpath for cooled air to pass from said cooling means to said cooling chamber means for cooling thereof, said cooling air inlet conduit means extending adjacent said entrance opening means and said exit opening means to minimize loss of cooled air therethrough and to enhance cooling characteristics within said cooling chamber means;
   E. a cooling air outlet conduit means positioned within said housing means adjacent said cooling means to provide a flowpath for air to return from said cooling chamber means to said cooling means for further cooling thereof; and
   F. a conveyor cleaning apparatus positioned within said housing means adjacent said conveyor means and adapted to clean said conveyor means during each cycle of movement thereof within said housing means.

16. A cooling tunnel means particularly usable for eggs comprising:
   A. a housing means defining a cooling chamber means therewithin for cooling of eggs passing therethrough, said housing means further defining an entrance opening means and an exit opening means in fluid flow communication with respect to said cooling chamber means to facilitate the movement of eggs into said cooling chamber through said entrance opening and outwardly therefrom through said exit opening means to facilitate cooling thereof, said entrance opening means being positioned vertically higher than said exit opening means, said housing means including an insulation means therealong to facilitate thermal isolation of said cooling chamber means from the external ambient environment, said cooling chamber means being operable to create a temperature stratification gradient therewithin wherein the cooler portion of the cooled air is located in the lower levels of said cooling chamber means and the warmer portion of the cooled air is located in the higher levels of said cooling chamber means, said housing means being of a generally rectangular configuration and including:
      (1) a first wall means;
      (2) a second wall means spatially disposed from said first wall means and extending generally parallel thereto;
      (3) a third wall means extending between said first wall means and said second wall means and extending generally perpendicularly with respect thereto;
      (4) a fourth wall means extending between said first wall means and said second wall means spatially disposed from and generally parallel with respect to said third wall means to form said housing means into a generally rectangular configuration;
   B. a conveyor means extending downwardly from said entrance opening throughout said cooling chamber means and extending to said exit opening means therebelow to facilitate the movement of eggs gradually downwardly throughout said cooling chamber means to facilitate slowly cooling thereof, said conveyor means being longitudinally angularly inclined downwardly within said cooling chamber means in order to lengthen the path of movement of said conveyor means therewithin to allow the eggs traveling thereupon to be located within said cooling chamber for an increased period of time to further facilitate slowly reducing of the temperature of the eggs as conveyed downwardly, said conveyor means being inclined downwardly longitudinally from said entrance opening means to said exit opening means, said conveyor means descending in a spiral path extending from said entrance opening toward said exit opening to lengthen the path of movement of eggs being carried thereupon for cooling, said conveyor means being coiled below itself in order to be at more than one vertical elevation within said cooling chamber means to lengthen the path of travel thereof within said cooling chamber to facilitate further cooling of eggs traveling thereupon;

C. a cooling means positioned within said housing means for cooling of air therewithin, said cooling means being operable to create a temperature stratification gradient within said cooling chamber means wherein the cooler portion of the cooled air is located in the lower levels of said cooling chamber means and the warmer portion of the cooled air is located in the higher levels of said cooling chamber means, said conveyor means being inclined downwardly longitudinally from said entrance opening means to said exit opening means to initially expose the eggs traveling upon said conveyor means within said cooling chamber means to the warmer portion of the cooled air and to thereafter expose the eggs traveling upon said conveyor means within said cooling chamber means to the cooler portion of the cooled air located at the lower levels within said cooling chamber means adjacent said exit opening means to facilitate further cooling of eggs traveling upon said conveyor means within said cooling chamber means immediately prior to exiting therefrom;

D. a cooling air inlet conduit means positioned within said housing means adjacent said cooling means to provide a flowpath for cooled air to pass from said cooling means to said cooling chamber means for cooling thereof, said cooling air inlet conduit means extending adjacent said entrance opening means and said exit opening means to minimize loss of cooled air therethrough and to enhance cooling characteristics within said cooling chamber means, said cooling air inlet conduit means comprising:
(1) a first cooling inlet conduit extending along said first wall means of said housing means between said cooling chamber means and said first wall means to facilitate thermal isolating of said cooling chamber means from the external ambient environment; and
(2) a second cooling inlet conduit extending along said second wall means of said housing means between said cooling chamber means and said second wall means to facilitate thermal isolation of said cooling chamber means from the external ambient environment;

E. a cooling air outlet conduit means positioned within said housing means adjacent said cooling means to provide a flowpath for air to return from said cooling chamber means to said cooling means for further cooling thereof, said cooling air outlet conduit means extends along said third wall means between said cooling chamber means and said third wall means to facilitate thermal isolation of said cooling chamber means from the external ambient environment; and F. a conveyor cleaning apparatus positioned within said housing means adjacent said conveyor means and adapted to clean said conveyor means during each cycle of movement thereof within said housing means.

* * * * *